July 21, 1953    J. R. MUNCK AF ROSENSCHÖLD    2,646,204

COMPRESSOR PLANT

Filed Nov. 10, 1948     2 Sheets-Sheet 1

Inventor
John Reitger Munck af Rosenschöld
by Jarvis C. Marble
his Attorney

Patented July 21, 1953

2,646,204

UNITED STATES PATENT OFFICE 2,646,204

COMPRESSOR PLANT

John Rutger Munck af Rosenschöld, Saltsjobaden, Sweden, assignor to Aktiebolaget Atlas Diesel, Sickla, near Stockholm, Sweden, a corporation of Sweden Application November 10, 1948, Serial No. 59,348 In Sweden November 13, 1947

10 Claims. (Cl. 230—12)

The present invention relates to compressor plants comprising electromotor driven compressors operated at different numbers of revolutions and on different loads.

One object of the invention is to reduce the costs of the compression work by the provision of means for producing a considerable amount of the pressure medium at high efficiency and/or by means of cheap electric power.

For these and other purposes I provide a compressor plant comprising in combination a compressor, electromotor equipment capable of operating said compressor for producing compression work at different speeds and including at least one main electromotor and means for changing the speed of the compressor, impulse giving means cooperatively connected with said speed changing means for changing the speed of the compressor, an auxiliary electromotor capable of accelerating said electromotor to said operating speeds, and a mechanism for unloading the compressor during the accelerating periods.

A plant according to the invention may, for instance, be arranged in such a manner that the impulses for changing the speed of the compressor consist in pressure impulses obtained from the working medium compressed by the compressor. The compressor may, for instance, be arranged to supply compressed air to a compressed air system including a receiver in which the pressure may vary within certain limits and which is connected to pressure operated switches controlling impulses for changing the speed of the compressor of the plant so that said compressor operates as far as possible at a speed resulting in maximum efficiency.

Another plant according to the invention may, for instance, be arranged in such a manner that the impulses for changing the speed of the compressor are obtained from a means controlling the power consumption in an electric power system and causing the compressor to be operated as far as possible at reduced load with high efficiency during the portions of each day and night when cheap electric power is available. Such a plant may preferably be combined with a compressed medium receiver which is so large that the compressor as a rule does not have to be operated during the time periods when high prices for electric energy are applied or when the electric system is subjected to high load.

Figure 1:
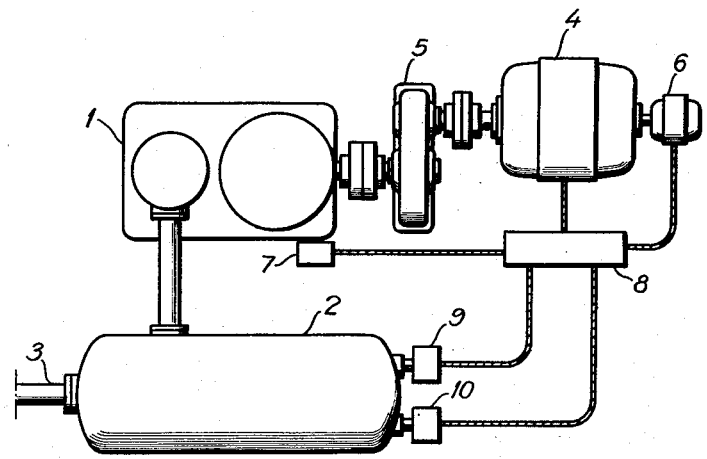
Figure 2B:
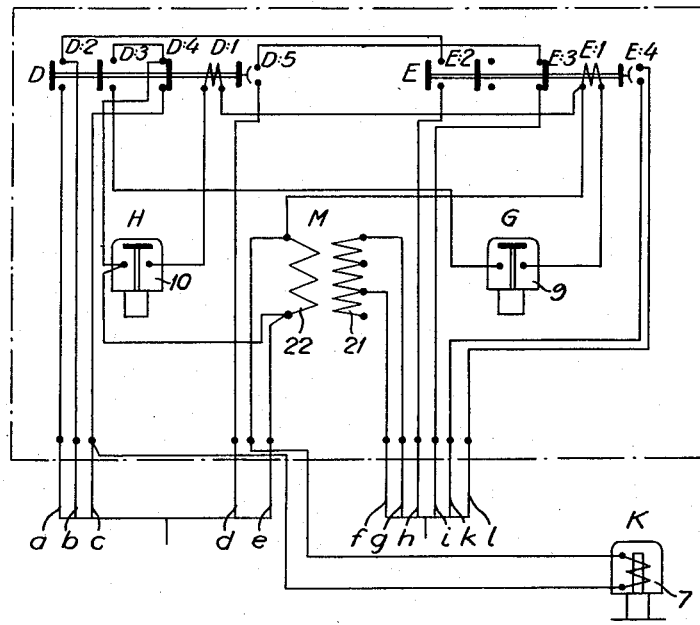
Figure 2A:
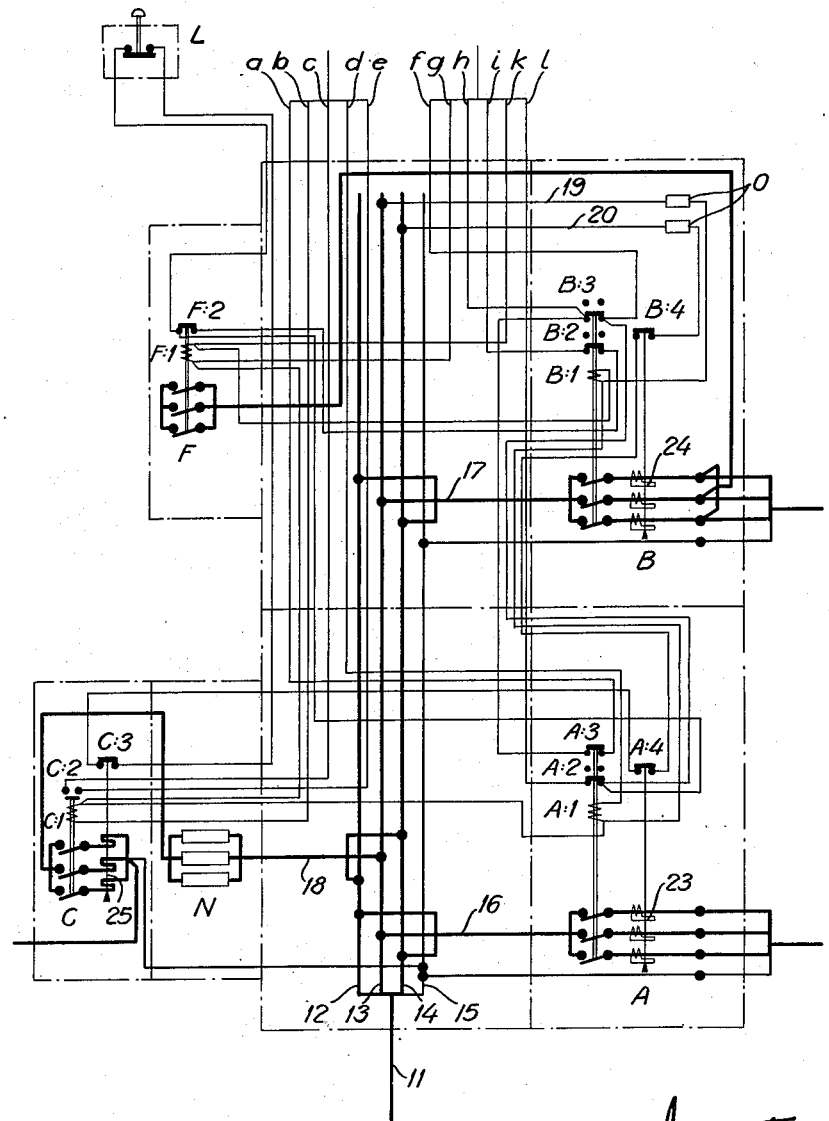

One embodiment of the invention which should only be considered as an example is described hereinbelow with reference to the accompanying diagrammatic drawings. Fig. 1 is a diagrammatic plan view of a plant according to the invention, and Figs. 2a and 2b show diagrammatically the connections and circuits of the plant according to Fig. 1.

The illustrated compressor plant consists of a compressor 1 supplying pressure medium, for instance compressed air, to a receiver 2 which is connected to a pressure medium consuming system 3. The compressor 1 is driven by an electromotor 4 over a speed reduction gear 5. A small auxiliary electromotor 6 is provided on the same shaft as the main motor 4 and serves to accelerate the main motor to the speeds at which it is intended to drive the compressor. The compressor is provided with an electromagnetic unloading mechanism 7 of conventional design which unloads the compressor during the periods when the main motor 4 is being accelerated by the auxiliary motor 6 and when the compressor is at rest. A switching means 8 controls the motors and the unloading mechanism according to impulses received from two pressure actuated switches 9 and 10 connected to the receiver 2. In the illustrated embodiment the main motor 4 is a change pole motor arranged for driving the compressor for production of compression work at two different speeds, the lower one of which being, for instance, half the high speed. Such change pole motors are known per se and do not form a subject of the present invention. The main motor 4 may also comprise an electromotor provided with several windings in order to be able to be operated at different speeds. The main motor may be an asynchronous or a synchronous motor, and it may naturally be arranged for operation at more than two different speeds which however makes the switching means 8 more complicated.

The above described plant which is intended to operate on a maximum absolute pressure of 8 kilogrammes per square centimetre mainly operates in the following manner.

Starting out from a normal condition where the plant has been operating and is connected to a compressed air system in which the pressure has reached a value where the compressor is unloaded and at rest, and assuming that the pressure in the receiver 2 falls to 7.7 kilogrammes per square centimetre absolute pressure, then the auxiliary motor 6 starts and accelerates the motor 4 which is not current carrying to the low operating speed. The main motor 4 is then cut in, the auxiliary motor is cut out, and the unloading mechanism 7 is made inoperable so that the compressor starts to supply compressed air to the receiver 2.

Now, if the pressure in the receiver 2 when the main motor 4 is operating at the low speed falls further to 7.5 kilogrammes per square centimetre then the unloading mechanism 7 is again actuated, the main motor 4 is cut out and the auxiliary motor is cut in and accelerates the main motor and the compressor to the high speed. The main motor is then again cut in, the auxiliary motor is cut out, and the unloading mechanism is made inoperable so that the compressor is now supplying compressed air to the receiver 2 at the high speed.

Now, if then during the operation of the compressor at the high speed the pressure should rise to 7.8 kilogrammes per square centimetre then the main motor is switched over to the low speed to which it runs down with the auxiliary motor or the unloading mechanism being actuated.

If the pressure in the receiver 2 while the main motor 4 is operating at the low speed should rise to 8.0 kilogrammes per square centimetre then the main motor is cut out and stops and the unloading mechanism is actuated so that the compressor still remains unloaded.

The details of the plant above described in general will now be described more particularly with reference to the diagrammatic Figures 2a and 2b. Said figures illustrate the switching means 8 and the devices connected thereto. The switching means 8 consists of a switch A for low speed, a switch B for high speed, a switch C for the auxiliary motor, and a switch F. Furthermore, said means includes an intermediate relay D for low speed and an intermediate relay E for high speed as well as a transformer M. The pressure actuated switch 9 contains a contact G which is closed when the pressure falls to 7.5 kilogrammes per square centimetre and which is opened when the pressure rises to 7.8 kilogrammes per square centimetre. The pressure actuated switch 10 contains a contact H which is closed when the pressure falls to 7.7 kilogrammes per square centimetre and which is opened when the pressure rises to 8.0 kilogrammes per square centimetre.

In Figs. 2a and 2b the circuits carrying the main current have for the purpose of greater clarity been drawn with heavy lines whereas the circuits carrying the control currents have been drawn with fine lines.

11 indicates the supply conduit of a three phase alternating current system the different phases of which are indicated by 12, 13 and 14. 15 indicates the ground connection. The diagram according to Fig. 2a is connected to the diagram in Fig. 2b at a through 1. From the supply conduit 11 wires 16 and 17 lead to the switches A and B for low and high speed, respectively, of the main motor and a wire 18 over a fuse N to the switch C of the auxiliary motor. The control current is obtained from the wires 13, 14 over wires 19 and 20 and fuses 0 to the switches A, B, C and F and to the primary 21 of the transformer M, the secondary 22 of which feeds the coils of the relays D and E and the coil K of the unloading mechanism 7.

The switch A for low speed apart from its main contacts lying in the circuit of the main motor is provided with a coil A:1 and auxiliary contacts A:2 and A:3 as well as a contact A:4 of an excess current relay 23. The switch B in similar way is provided with main contacts lying in the circuit of the main motor and a coil B:1, auxiliary contacts B:2 and B:3, and a contact B:4 of an excess current relay 24. The switch C of the auxiliary motor 6 is provided with main contacts lying in the circuit of the auxiliary motor, a coil C:1, auxiliary contact C:2 and a contact C:3 of an excess current relay 25. The intermediate relay D has a coil D:1 and auxiliary contacts D:2—D:5 of which the contact D:5 closes with time delay. The intermediate relay E has a coil E:1 and auxiliary contacts E:2—E:4 of which the contact E:4 is designed to close with time delay. The switch F, finally, is provided with main contacts lying in the circuit on the main motor and with a coil F:1 and an auxiliary contact F:2. L designates the contact of a push button switch by means of which the entire compressor plant may be stopped.

When the plant is ready to operate and the compressor is at standstill and full pressure prevails in the compressed air system and in the receiver 2 then the switches A, B, C and F are open and the main motor 4 and the auxiliary motor 6 consequently cut out. The intermediate relays D and E are then also cut out leaving the contact D:4 in closed position so that the coil K is energized and keeps the unloading valve 7 open. Consequently, the compressor is unloaded at rest and the two pressure operated switches have opened their contacts, as illustrated in Figs. 2a and 2b.

Now, if the pressure drops to 7.7 kilogrammes per square centimetre absolute pressure then the pressure actuated switch 10 closes its contacts H. The coil D:1 of the intermediate relay D is then energized and the contacts D:2 and D:3 are closed simultaneously with the opening of the contact D:4. The contact D:5 operates with time delay and is closed only after a certain time for which it is set. The contact D:2 closes a circuit through the coil C:1 of the switch C for the auxiliary motor so that such switch is closed and the auxiliary motor starts to accelerate the main motor to the low speed. With switch C closed, current is again admitted to the unloading mechanism 7, the circuit of which was open at D:4, now through a circuit over the contact C:2. When the time delay determined for the contact D:5 has elapsed then the auxiliary motor 6 has had time to accelerate the main motor 4 to the low speed, and when the contact D:5 is closed the coil A:1 is energized so that the switch A is closed and cuts in the main motor for operation at low speed. When the switch A closed the current to the coil C:1 was interrupted at A:3 so that the switch C is opened and cuts out the auxiliary motor. Upon opening of the switch C the current to K was interrupted at C:2, and, consequently, the coil K no longer keeps the unloading valve 7 open. Such valve therefore closes and the compressor starts to work.

If the pressure in the receiver 2 when the main motor runs at low speed drops to 7.5 kilogrammes per square centimetre then the pressure actuated switch 9 closes its contact G. The coil E:1 in the intermediate relay E is then energized and the relay E breaks the circuit to the coil A:1 at the contact E:3 so that the switch A opens. Simultaneously, the contact E:2 in the relay E closes the circuit to the coil C:1 so that the switch C is closed and the auxiliary motor starts and accelerates the main motor to the high speed. When the switch C was closed the circuit was closed at C:2 to the coil K of the unloading valve 7 so that said valve is opened and the compressor unloaded. After a predetermined time period the contact E:4 is closed and the switch B is closed and connects the main motor for operation at high speed. The contact E:4 also closed the circuit to F:1 so that F was closed. When B was closed the circuit to C:1 was opened so that the switch C is opened and the auxiliary motor cut out and the unloading valve 7 closed. The main motor 4 now runs at high speed and the compressor is again working.

If the pressure when the compressor works at high speed rises to 7.8 kilogrammes per square centimetre then the pressure actuated switch 9 opens the contact G. The circuit to the coil E:1 of the intermediate relay E is then opened and such relay returns to the position illustrated in Fig. 2b. The contact E:4 is then opened without time delay and the current to the coils B:1 and F:1 is broken so that the switch B for high speed and the switch F are opened. When the relay E was deenergized the contact E:3 was closed and when the switches B and F were opened the contacts B:2 and F:2 were closed. The contact D:5 of the relay D being already closed the circuit to the coil A:1 of the switch A for low speed is now closed and the coil A:1 energized. Consequently the switch A is closed and connects the main motor 4 for operation at low speed. The contact A:3 in the switch A was opened when the switch A was closed and prevents the auxiliary motor 6 from starting when the main motor changes from high to low speed. The contact A:2 was also opened and prevents the switch B from being closed as long as the switch A is closed.

If the pressure when the main motor runs at low speed rises to 8 kilogrammes per square centimetre then the pressure actuated switch 10 opens the contact H and interrupts the current to the coil D:1 of the relay D which in turn opens the circuit to A:1 at the contact D:5 without time delay so that the switch A is opened and the main motor is cut out and stops. When the relay D was deenergized the contact D:4 was closed so that the coil K was energized and the unloading valve 7 opened. Consequently, the compressor is at rest in unloaded condition.

The compressor plant above described and illustrated in the drawings should be considered only as an example and the details of the invention may be modified in several different ways within the scope of the claims. The switching means 8 may, for instance, be arranged in such a manner that the auxiliary motor 6 is still connected after accelerating the main motor 4 to the high speed and thereafter assists the main motor in driving the compressor.

What I claim is:

1. A compressor plant comprising in combination a compressor, electromotor equipment capable of operating said compressor for producing compression work at different speeds and including at least one main electromotor and means for changing the speed of the compressor, impulse creating means cooperatively connected with said speed changing means for changing the speed of the compressor, an auxiliary electromotor capable of accelerating said main electromotor to said operating speeds and an unloading mechanism for operation of the compressor at no load during the accelerating periods.

2. A compressor plant comprising in combination a compressor, a main electromotor capable of driving said compressor for producing compression work at different speeds upon change of the power input connections to said motor, means for changing the said connections, impulse creating means cooperatively connected with said changing means for changing the speed of the compressor, an auxiliary electromotor capable of accelerating said main electromotor to said driving speeds and an unloading mechanism for operation of the compressor at no load during the accelerating periods.

3. A compressor plant comprising in combination a compressor, a main electromotor capable of driving said compressor for producing compression work at least at two different speeds upon change of the number of poles of said main motor, means for changing the number of poles of the main motor, impulse creating means cooperatively connected with said pole changing means for changing the speed of the compressor, an auxiliary electromotor capable of accelerating said main electromotor to said driving speeds and an unloading mechanism for operation of the compressor at no load during the accelerating periods.

4. A compressor plant comprising in combination a compressor, a main electromotor having at least two different windings and capable of driving said compressor for producing compression work at different speeds upon change of the connections of said windings, means for changing the connections of the windings, impulse creating means cooperatively connected with said changing means for changing the speed of the compressor to a low or high value, respectively, an auxiliary electromotor capable of accelerating said electromotor to said low and high speeds, and a mechanism for unloading the compressor during the accelerating periods from stopped condition to said low speed and from said low speed to said high speed.

5. A compressor plant according to claim 1, in which said electromotor equipment includes means for connecting said auxiliary electromotor according to impulses from said impulse creating means so as to accelerate the main electromotor initially from stopped condition to a predetermined low speed for producing compression work at said low speed and thereafter in response to further impulses from the impulse creating means to accelerate the main electromotor from said low speed to a high speed of the compressor for producing compression work at said high speed.

6. A compressor plant according to claim 1, in which said electromotor equipment includes means for disconnecting said auxiliary motor after accelerating the main electromotor to any of the speeds at which the compressor is operated for producing compression work.

7. A compressor plant according to claim 1, in which said impulse creating means consist of pressure actuated devices influenced by the pressure in a receiver fed with pressure medium from the compressor.

8. A compressor plant according to claim 1, in which said impulse giving means consists of one pressure actuated device operative within certain pressure limits and another pressure actuated device operative within certain other pressure limits.

9. A plant for delivering pressure fluid to a consumer of pressure fluid comprising a compressor; a delivery conduit for conducting pressure fluid compressed by the compressor to said consumer unloading means for permitting the compressor to be operated at no load; a main electric motor for driving said compressor and operatively connected thereto; means for changing the speed of said main motor; an auxiliary motor of relatively small power operatively connected to said main motor and for driving said main motor and said compressor when the compressor is operating at no load only; and impulse creating means cooperatively connected to said unloading means, said change speed means for the main motor, and said auxiliary motor; whereby the speed at which the main motor drives the compressor may be varied to provide efficient operation of said plant.

10. A plant for delivering pressure fluid to a consumer of pressure fluid comprising a compressor, unloading means for permitting the compressor to be operated at no load, a delivery conduit for conducting pressure fluid compressed by the compressor to said consumer, electric motor equipment capable of operating said compressor for producing compression work at different speeds and including at least one main electric motor, an auxiliary electric motor capable of accelerating said main electric motor at least to one of said operating speeds and means for changing the speed of the compressor, and impulse creating means cooperatively connected to said speed changing means, said motors and said unloading means to unload the compressor while said speed changing means is operated to increase the compressor speed.

JOHN RUTGER MUNCK AF ROSENSCHÖLD.

References Cited in the file of this patent

UNITED STATES PATENTS

| Number | Name | Date |
|---|---|---|
| 887,252 | Jackson | May 12, 1908 |
| 1,445,753 | Carroll | Feb. 20, 1923 |
| 1,602,938 | Riesner | Oct. 12, 1926 |
| 1,752,871 | Wieseman | Apr. 1, 1930 |
| 2,294,410 | Lamberton | Sept. 1, 1942 |